United States Patent [19]
Arimilli et al.

[11] Patent Number: 6,032,226
[45] Date of Patent: Feb. 29, 2000

[54] METHOD AND APPARATUS FOR LAYERING CACHE AND ARCHITECTURAL SPECIFIC FUNCTIONS TO EXPEDITE MULTIPLE DESIGN

[75] Inventors: Ravi Kumar Arimilli, Austin; John Steven Dodson, Pflugerville; Jerry Don Lewis, Round Rock; Derek Edward Williams, Austin, all of Tex.

[73] Assignee: International Business Machines Corporation, Armonk, N.Y.

[21] Appl. No.: 08/834,115

[22] Filed: Apr. 14, 1997

[51] Int. Cl.[7] .............................. G06F 12/00; G06F 13/00
[52] U.S. Cl. .............................. 711/118; 711/3; 711/130; 711/140; 711/169
[58] Field of Search ................................ 711/3, 118, 130, 711/129, 140, 153, 154, 169, 170; 395/653, 284, 800.01

[56] References Cited

U.S. PATENT DOCUMENTS

| | | | |
|---|---|---|---|
| 4,926,363 | 5/1990 | Nix | 702/120 |
| 5,301,278 | 4/1994 | Bowater et al. | 711/5 |
| 5,408,229 | 4/1995 | Yabusaki et al. | 340/825.5 |
| 5,434,993 | 7/1995 | Liencres et al. | 711/133 |
| 5,485,590 | 1/1996 | Hyatt et al. | 711/115 |
| 5,535,360 | 7/1996 | Cassetti | 711/140 |
| 5,537,572 | 7/1996 | Michelsen et al. | 711/135 |
| 5,644,753 | 7/1997 | Ebrahim et al. | 711/131 |
| 5,659,715 | 8/1997 | Wu et al. | 711/170 |
| 5,671,355 | 9/1997 | Collins | 395/200.8 |
| 5,752,047 | 5/1998 | Darty et al. | 395/750.01 |

FOREIGN PATENT DOCUMENTS

| | | |
|---|---|---|
| 0 176 972 A2 | 4/1986 | European Pat. Off. . |
| 0 258 559 A2 | 3/1988 | European Pat. Off. . |
| 2 107 092 | 4/1983 | United Kingdom . |
| 2 256 512 | 12/1992 | United Kingdom . |
| 2 302 190 | 11/1995 | United Kingdom . |
| WO 87/04823 A1 | 8/1987 | WIPO . |

*Primary Examiner*—Tuan V. Thai
*Attorney, Agent, or Firm*—Mark E. McBurney; Daniel E. Venglarik; Andrew J. Dillon

[57] ABSTRACT

Cache and architectural specific functions within a cache controller are layered and provided with generic interfaces, isolating the complexities of each and allowing the overall functionality to be further divided into distinct, largely autonomous functional units. Each functional unit handles a certain type of operation and may be easily replicated or removed from the design to provide a number of cache designs with varied price and performance.

18 Claims, 4 Drawing Sheets

METHOD AND APPARATUS FOR LAYERING CACHE AND ARCHITECTURAL SPECIFIC FUNCTIONS TO EXPEDITE MULTIPLE DESIGN

RELATED APPLICATIONS

The present invention is related to the subject matter of the following commonly assigned copending United States patent applications, each filed Apr. 14, 1997: Ser. No. 08/839,442, now pending, entitled "Method of Layering Cache and Architectural Specific Functions"; Ser. No. 08/843,114, now pending, entitled "Method of Layering Cache and Architectural Specific Functions for Splitting Operations"; Ser. No. 08/839,445, now pending, entitled "Method of Layering Cache and Architectural Specific Functions to Permit Generic Interface Definition"; Ser. No. 08/839,442, now pending entitled "Method of Layering Cache and Architectural Specific Functions to Permit Facilitate Design Extension"; and Ser. No. 08/839,441, now pending, entitled "Method of Layering Cache and Architectural Specific Functions to Promote Operation Symmetry." The content of the above-mentioned copending applications is incorporated herein by reference.

BACKGROUND OF THE INVENTION

1. Technical Field

The present invention relates in general to cache controllers in data processing systems and in particular to cache controllers which layer cache and architectural specific functions. Still more particularly, the present invention relates to layering cache and architectural specific functions within a cache controller to permit controller functions to be implemented as distinct, substantially autonomous functional units which may be efficiently replicated or removed to produce multiple designs with different cost/performance characteristics.

2. Description of the Related Art

Data processing systems which utilize a level two (L2) cache typically include a cache controller for managing transactions affecting the cache. Such cache controllers are conventionally implemented on a functional level, as depicted in FIG. 4. For example, a cache controller 402 may include logic 404 for maintaining the cache directory, logic 406 for implementing a least recently used (LRU) replacement policy, logic for managing reload buffers 408, and logic for managing store-back buffers 410. In traditional implementations, the cache is generally very visible to these and other architectural functions typically required for cache controllers, with the result that cache controller designs are specific to a particular processors such as the PowerPC™, Alpha™, or the x86 family of processors.

The basic cache controller design depicted in FIG. 4 is difficult to rework in order to produce new designs. The controller's functional nature gives rise to a complex set of interrelated logic which is difficult to reconfigure. Often it is simpler to start from scratch rather than attempt to modify and existing design to alter performance. Resources are tightly coupled and may not be added or removed from the design in a straightforward manner to alter the controller performance. In addition, the complex logic significantly restrains the maximum frequency achievable for the design.

Until recently, little need has been perceived for cache controllers of similar designs but differing price/performance characteristics. In particular, two largely distinct classes of data processing systems have arisen in the field: servers and clients. Servers are typically systems intended to provide data and services in a overall larger network of computers and are used simultaneously by a number of users. In contrast, clients are typically desktop systems used by a single user.

For servers, performance is a more driving concern than cost, with price being a significantly less important consideration. For clients, the critical factor is more often price than performance. Even within this overall grouping of servers and clients, however, there still has arisen widely varying price/performance needs.

Cache controller performance is dominated by three distinct issues: clock speed, cache size and number of simultaneous operations supported. Clock speed determines the overall rate at which operations are serviced by the cache and the system as a whole. Cache size affects the hit/miss ratio for the cache, which determines the cache's overall effectiveness in providing data to the processor without resort to retrieving data from the (typically slower) system memory or lower level cache. The number of outstanding operations supported by the cache controller affects cache performance by the number of operations which may be serviced, on average, per unit of time. Most modern data processing systems employ a well known feature—a pipelined split transaction bus—in both the system and processor buses. This feature is specifically intended to allow multiple outstanding operations at any given time. By increasing the resources available in the cache to permit more outstanding operations to be maintained at a given time, a higher overall performance can be achieved.

It would therefore be desirable to implement a cache controller permitting efficient removal or addition of resources to implement multiple cache controller designs having varying price and performance characteristics. It would further be advantageous to provide a resource structure supporting higher clock frequencies, such that even the least expensive design operates faster.

SUMMARY OF THE INVENTION

It is therefore one object of the present invention to provide an improved cache controller for a data processing system.

It is another object of the present invention to provide an improved cache controller having layered cache and architectural specific functions.

It is yet another object of the present invention to layer cache and architectural specific functions within a cache controller to permit controller functions to be implemented as distinct, substantially autonomous functional units which may be efficiently replicated or removed to produce multiple designs with different cost/performance characteristics.

The foregoing objects are achieved as is now described. Cache and architectural specific functions within a cache controller are layered and provided with generic interfaces, isolating the complexities of each and allowing the overall functionality to be further divided into distinct, largely autonomous functional units. Each functional unit handles a certain type of operation and may be easily replicated or removed from the design to provide a number of cache designs with varied price and performance.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
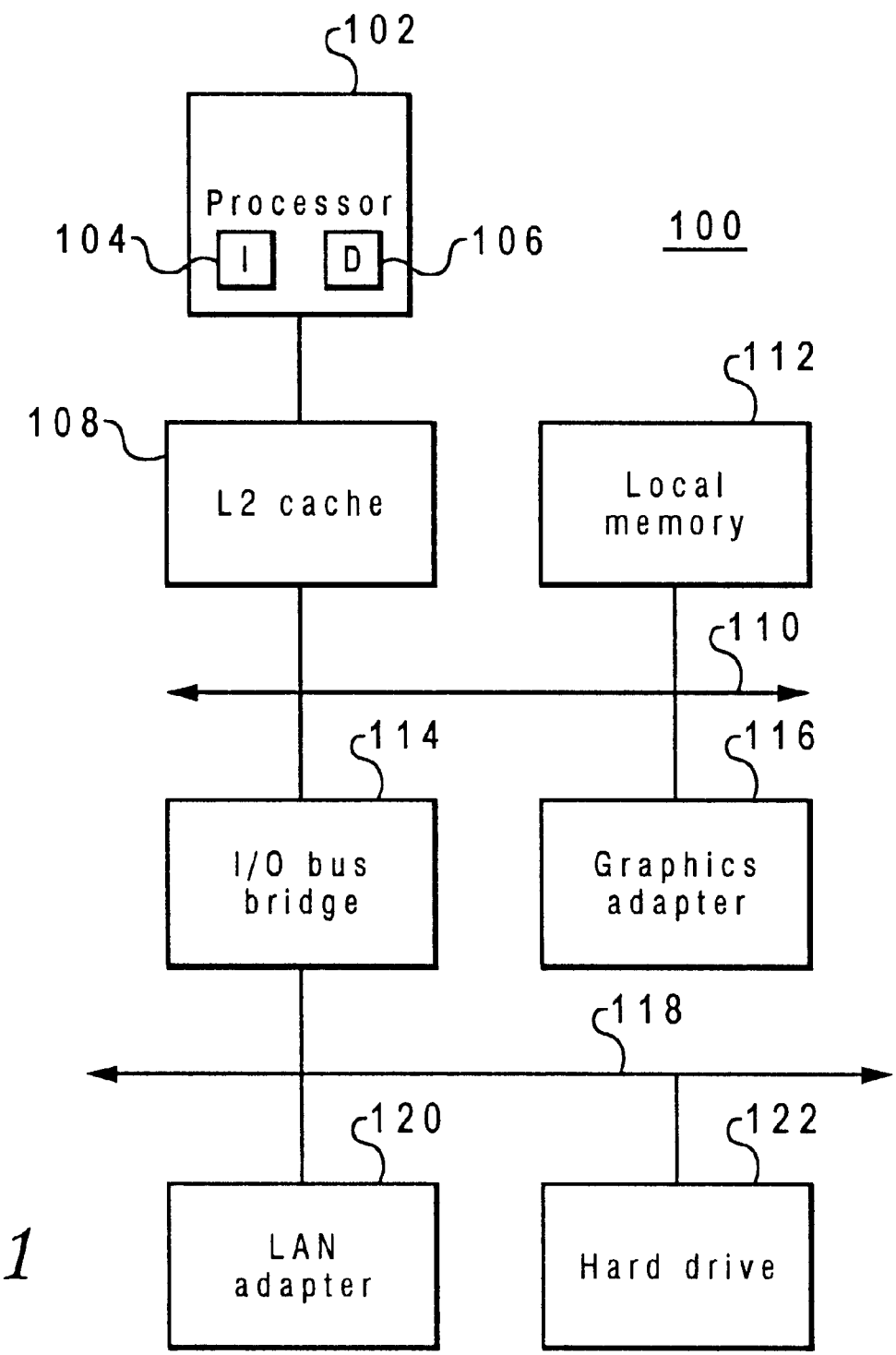
FIG. 1 depicts a data processing system implemented with a cache controller design in accordance with a preferred embodiment of the present invention.

With reference now to the figures, and in particular with reference to FIG. 1, a data processing system implemented with a cache controller design in accordance with a preferred embodiment of the present invention is depicted. Data processing system 100 may include only a single processor or may be a symmetric multiprocessor (SMP) system including a plurality of processors. A single processor system is shown in the example depicted. Processor 102 may be a superscalar reduced instruction set computing (RISC) processor including separate level one instruction and data caches 104 and 106 within the processor. A PowerPC™ processor may be utilized for processor 102.

Processor 102 is connected to a level two (L2) cache 108, which is a nonshared cache. A second processor (not shown) may be added to the system depicted, either with a separate L2 cache or sharing L2 cache 108 with processor 102. L2 cache 108 is connected to system bus 110 for data processing system 100. Local memory 112 is also connected to system bus 110, as is I/O bus bridge 114. Other devices, such as memory-mapped graphics adapter 116, may also be connected to system bus 110. I/O bus bridge 114 is connected to I/O bus 118, which may be connected to a variety of other devices such as local area network (LAN) adapter 120 and hard disk drive 122.

Those of ordinary skill in the art will appreciate that the hardware depicted in FIG. 1 may vary. For example, other peripheral devices, such as optical disk drive and the like also may be used in addition or in place of the hardware depicted. The depicted example is not meant to imply architectural imitations with respect to the present invention. In particular, a data processing system need not be limited to a single processor as shown in the depicted example to benefit from the present invention. The present invention may be employed, for example, to improve the performance of a data processing system having two processors, each with a corresponding L2 cache.

Figure 2:
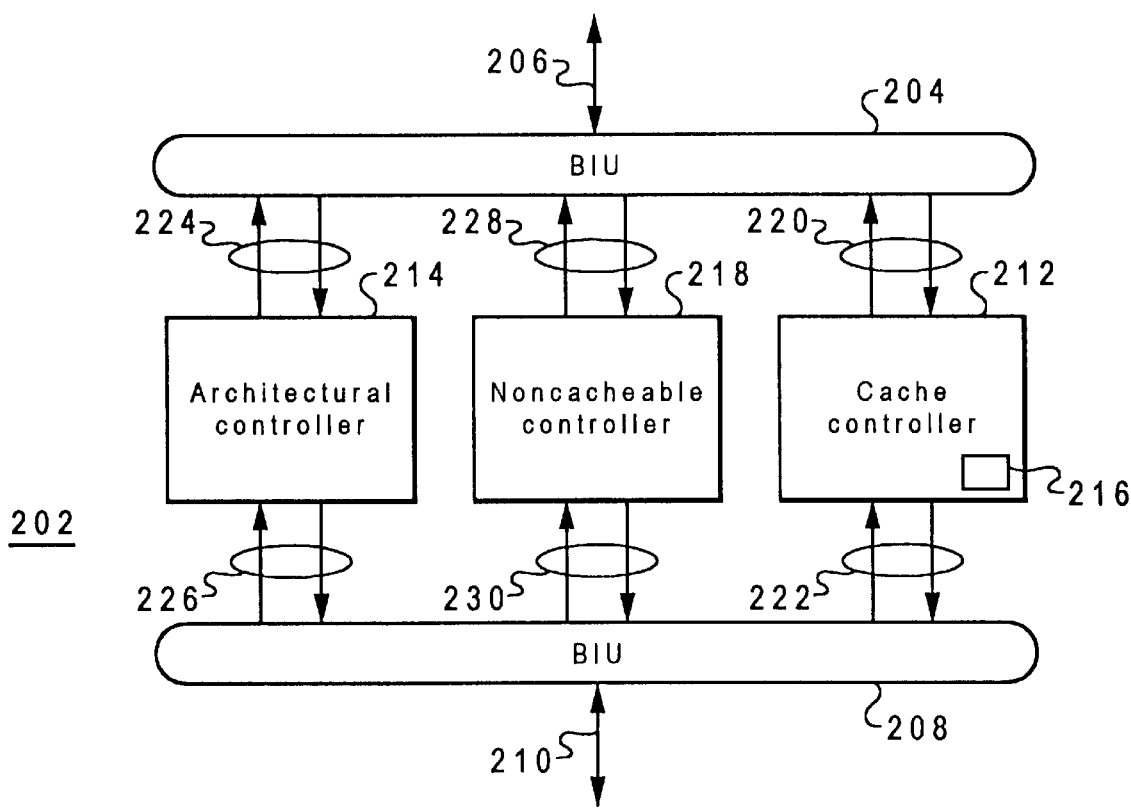
FIG. 2 is a block diagram of a cache controller design in accordance with a preferred embodiment of the present invention.

Referring to FIG. 2, a block diagram of a cache controller design in accordance with a preferred embodiment of the present invention is illustrated. Controller 202 is implemented within cache 108 depicted in FIG. 1. Controller 202 includes a bus interface unit (BIU) 204 connected to an upper bus 206 for a processor or a higher level cache, and a bus interface unit 208 to a lower bus 210, which may a system bus or a bus to another cache. Upper bus 206 and lower bus 210 may differ; upper bus 206 may be, for example, a 60X bus, while lower bus 210 may be a different bus.

Cache and architectural specific functions within controller 202 are layered. Thus, controller 202 includes cache controller 212 and architectural controller 214. Operations are distinguished as "cache" or "architectural" operations. Only cache operations are handled by cache controller 212, and only cache controller 212 performs operations on cache 216. Architectural operations are handled by architectural controller 214 and are seen by cache controller 212 as system-side operations.

A third unit, noncacheable controller 218, is also contained within cache controller 202. Noncacheable controller 218 is actually a counterpart to cache controller 212 in that it also handles only cache operations. Whereas cache controller 212 handles cache operations directed at cache memory locations, noncacheable controller 218 handles cache operations directed at memory locations which do not map to cache 216. It is advantageous, for reasons known to those skilled in the art, to treat part of the system memory as noncacheable. Such memory may be utilized, for example, by memory mapped devices. While cache controller 212 operates on full cache blocks, noncacheable controller 218 operates on smaller memory segments, typically less than 8–16 bytes. Moreover, noncacheable controller 218 does not store data, while cache controller 212 retains copies of data handled within cache 216.

Cache operations are typically those operations which read or write values to memory locations, and therefore may change or retrieve the value of data in a memory location. Remaining operations are defined as architectural operations. Unlike cache operations, architectural operations generally do not change the value of data in a memory location. An architectural operation may move the data to a different location within the cache hierarchy, change the status of data in a particular memory location, or perform other such functions. However, architectural operations generally do not directly alter the value of data within a memory location.

Cache operations, supported by cache controller 212, comprise the largest majority of operations affecting the system cache. Within the complete set of operations supported by a given processor, cache operations may not derive from the portion of the instruction set which is most frequently executed and/or consume the largest majority of processor cycles. However, disregarding instructions directed to other functional units within the processor, such as the floating point, fixed point, or branch units, cache operations are, collectively, executed most often and utilize the largest measure of time.

The remaining operations affecting a system cache—those employed for cache management, operating system management, page management, and synchronization, etc.—are layered out and supported by architectural controller 214. Virtually all processor architectures support such operations, which are utilized in real time operation much less frequently than cache operations. Additionally, individual operations among the architectural operations are generally implemented, if at all, in substantially divergent manners for different processors of interest. Processor-side architectural operations pass through architectural controller 214 to system bus 210 and affects cache controller 212 as apparent system-side architectural operations.

Different designs may vary the set of operations supported by the cache controller and, by default, the remaining operations layered for support by the architectural controller. However, increasing the number of operations supported by the cache controller increases the complexity of logic required. Additionally, if instructions selected for support by the cache controller are not supported by all processors of interest, the cache controller design loses its direct transferability to new controller designs.

While certain operations pass down only one path within controller 202—that is, through architectural controller 214 or cache controller 212—other operations are split and pass down both paths. Cache controller 212 employs a pass-through design, in which operations initiated at interface 220 generate a response at interface 222 while operations initiated at interface 222 produce a responsive action at interface 220.

Because cache and architectural operations are layered within controller 202, bus transactions and protocols may also be layered. That is, generic interfaces may be defined for cache controller 212, architectural controller 214, and noncacheable controller 218. Thus, interfaces 220–230 comprise generic protocol interfaces to bus interface units 204 and 208 which are, to the extent possible, not architecturally specific. This decouples the design for cache controller 212 from the specific protocols of bus 206 and bus 210, allowing the design for cache controller 212 to be reused. Bus interface units 204 and 208 are responsible for managing transactions and protocols to bus 206 and system bus 210, translating the specific bus transactions into the protocol for generic interfaces 220–230. By employing generic interfaces for interfaces 220–230, the designs for controllers 212, 214, and 218 are isolated from specific bus architectures and may be readily duplicated.

In contrast to traditional cache controllers, cache controller 212 may thus be implemented in a manner independent of the two buses 206 and 210, responding only to cache operations. Although such cache operations are initiated by transactions on either bus 206 or bus 210, only certain bus transactions will prompt a response within cache controller 212. In a preferred embodiment, cache controller 212 only responds to instruction fetch operations (IFETCH), LOAD operations, and WRITE operations on bus 206, and to READ operations, WRITE operations, and traditional SNOOPS on bus 210. This results in substantially simplified design requirements for cache controller 212. This is accomplished by avoiding the usual practice of overlaying the highly irregular (semantically and temporally) architectural operations and cache operations. The burden of responding to the architectural operations is removed from the design of cache controller 212 and placed in architectural controller 214.

The cache operations handled by cache controller 212 are supported by every commercial processor of interest in substantially the same form. Only minor differences in specific implementation, from which cache controller 212 in the present invention is decoupled by generic interfaces 220 and 222, distinguish comparable instructions for different processors of interest.

By layering selected cache and architectural functions, and implementing generic interfaces to bus interface units 204 and 208, a large portion of the overall design of controller 202 may be directly transferred to new implementations. The cache controller logic may be reused without modification for cache operations. New sleeves of logic for the bus interface units may be easily implemented for handling new bus protocols and converting the generic protocol interfaces 220–230 of cache, architectural, and noncacheable controllers 212, 214, and 218 to interfaces for bus 206 and bus 210. The most significant effort for implementing a design supporting a different processor is required by the architectural controller. Individual design of the logic supporting the architectural operations is required in any case since processor architectures vary dramatically. Overall, however, a significant savings in design effort for different processors may be achieved since only the semantics of operations handled by architectural controller 214 will change.

By layering cache and architectural functions, limiting cache controller 212 to responding to a few fundamental operations, the cache controller logic is greatly streamlined and simplified. In addition, the architectural controller logic is also simplified since, by separating the two classes of operations, issues of interrelationships between operations in different classes are eliminated. The cache and architectural controllers may be designed as individual units.

Figure 3:
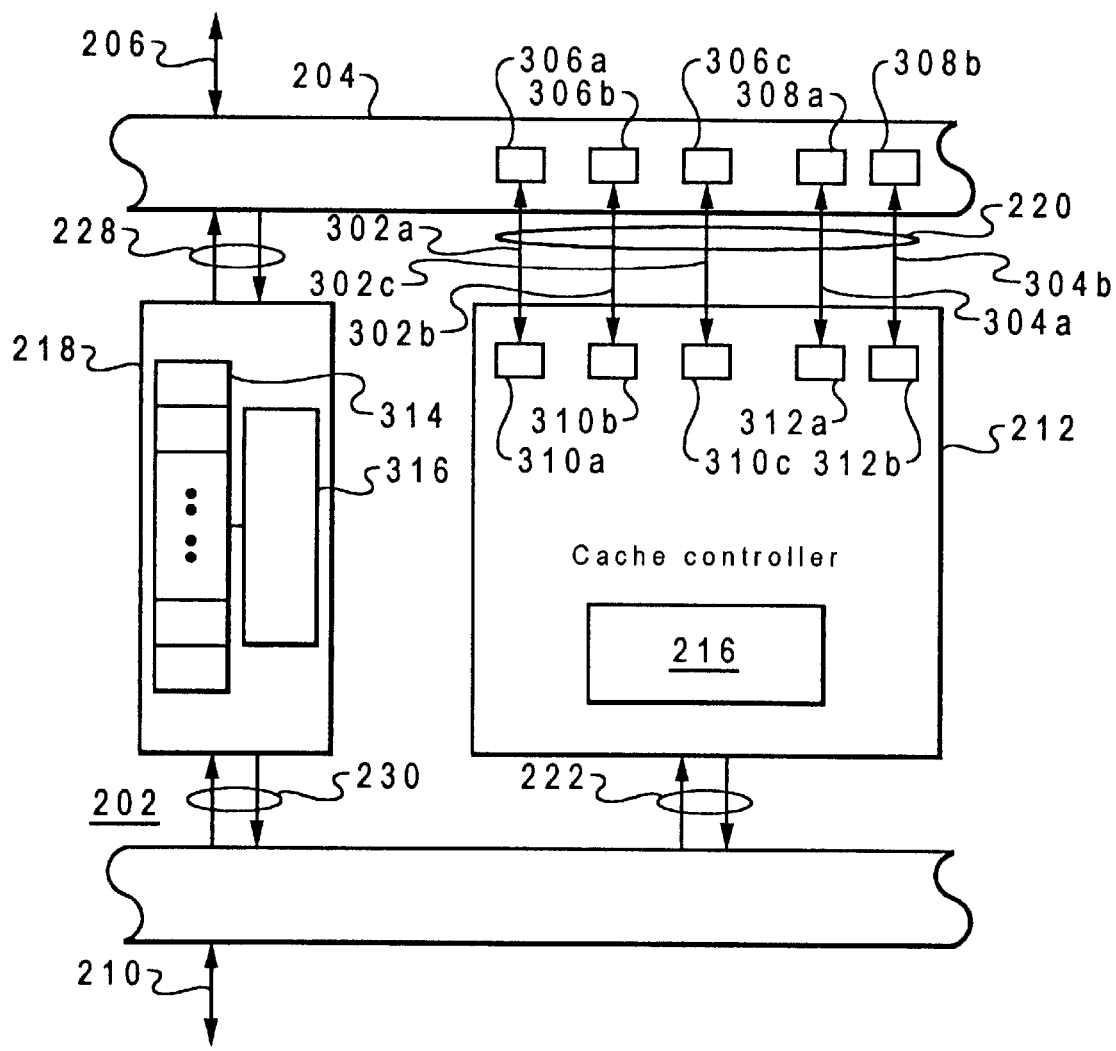
FIG. 3 depicts an additional view of the cache controller, noncacheable controller, and bus interface units within a controller in accordance with the preferred embodiment of the present invention.
Figure 4:
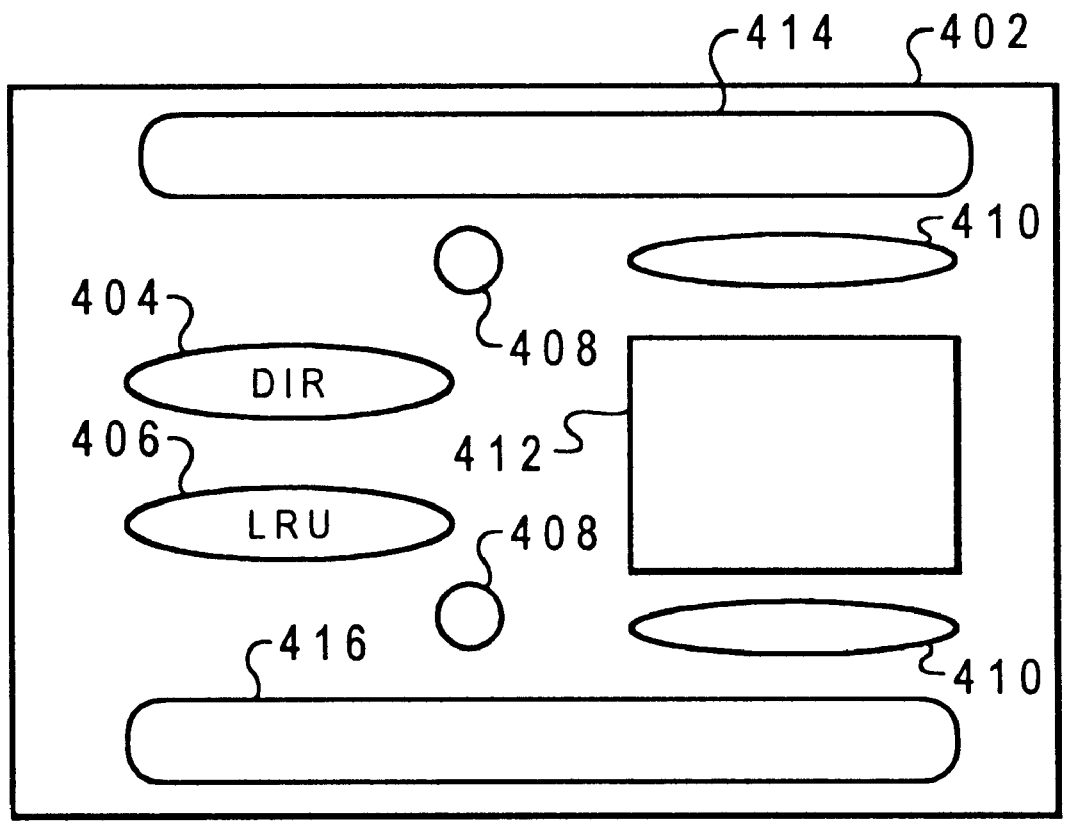
FIG. 4 is a prior art cache controller design.

With reference now to FIG. 3, an additional view of the cache controller, noncacheable controller, and bus interface units within a controller in accordance with the preferred embodiment of the present invention is depicted. Additional details depicting various techniques for layering cache controller 212, noncacheable controller 216, and bus interface units 204 and 208 are shown.

From the processor side, cache controller 212 operates on instruction fetch operations, READ operations, and WRITE operations. Instruction fetch operations are considered a special case of READ operations and are handled in substantially the same manner as other READ operations. Three interfaces for READ operations and two interfaces for WRITE operations have been arbitrarily selected for the exemplary embodiment. Therefore, the generic interfaces 220 between cache 212 and bus interface unit 204 are divided into two separate groups: those for READ (and instruction fetch) operations (302a, 302b, and 302c, and those for WRITE operations 304a and 304b. Within bus interface unit 204 and cache controller 220, functional units responsible for communicating these operations over the generic interfaces are provided.

Bus interface unit 204 is depicted with three functional units 306a, 306b, and 306c for processing READ operations over the generic interfaces 220 to cache controller 212 and two functional units 308a and 308b for processing WRITE operations over the generic interfaces 220 to cache controller 212. Similarly, cache controller 212 has corresponding functional units 310a–310c and 312a–312b to handle operations passed from bus interface unit 204. These functional units for specific operations, 310a–310c and 312a–312c, are typically identical in most respects and can easily be replicated or removed. This allows for the rapid redesign of cache controller to new price/performance characteristics. A similar structure of cooperating, largely autonomous functional units is employed at most of the interfaces 220–230 between bus interface units 204 and 208 and cache controller 212, architectural controller 214, and noncacheable controller 218.

Separate logic (not shown) manages the interaction between functional units 306a–306c, 308a–308b, 310a–310c, and 312a–312b. In particular, the managing logic assigns operations of a given type (e.g. a READ operation) to a particular functional unit, such as functional unit 310b, for processing that operation. A variety of well-known methods (fixed encoding, random, etc.) may be employed for this purpose. Interaction between functional units is kept to an absolute minimum to provide modularity and aid in managing complexity. Often, but not in all cases, the only necessary interaction between functional units is the communication of an "in-use" indication in order to allow the managing logic to determine which functional units are available when allocating a functional unit to a new operation. Reducing communication between functional units also substantially reduces the complexity of and required interlock logic and allows for higher frequency clock designs.

In addition to the autonomous functional unit structure depicted for cache controller 212, another structure often appropriate for managing operations with the cache controller is a unified queue 314 of operations managed by a single control unit 316. Although this structure is better suited for noncacheable controller 218, those skilled in the art will recognize that it can be employed in other units in controller 202 depending on circumstances specific to the implementation.

In the depicted example, queue 314 receives operations from bus interface unit 204. The operations are placed into queue 316 and passed to system bus interface unit 208 under the control of control logic 316. The capacity of a queuing structure such as that depicted is dependent on the number of positions within the queue. The addition or removal of positions within a queue is typically a straightforward process, allowing easy alteration of the queue structure capacity. Such queues are typically most advantageous in the propagation of single beat WRITE operations from the processor to the system bus, although those skilled in the art will recognize that queues may be both employed in cache controller 212, architectural controller 214, to propagate operations from system bus 210 to processor bus 206, or in some combination thereof.

The utilization of queues and largely autonomous communicating functional units within the various major components of controller 202 greatly simplifies the task of removing or adding resources to produce a new controller with differing price/performance characteristics. In addition, use of such regular structures to handle operations eases the difficulty of achieving high frequency controller designs, leading to greater overall performance. For example, an extremely important factor in cache performance—cache size—is easily changed to suit any particular price/performance goal due to the regular nature of the cache data array.

Queues and communicating functional units are not the only structures which may be utilized within cache controller 212, architectural controller 214, and noncacheable controller 218 to achieve the desired ease of replication or removal. Other structures known in the art may be also be suitably employed.

The present invention layers cache and architectural specific functions within a controller to permit the required logic to be reduced to functional units or queue structures which may be easily replicated or removed. Thus, a particular controller design may be readily modified to improve performance or decrease costs, depending on the commercial circumstances. The division of functional logic into such easily reproducible and additive modular segments would not be possible without layering cache and architectural functions.

The modifications required to add resources to (or remove resources from) a controller design under the present invention are straightforward and present a much lower obstacle than prior art approaches to producing multiple designs. The reduction in complexity also allows higher frequency designs to be achieved, improving the performance of every design within the family.

While the invention has been particularly shown and described with reference to a preferred embodiment, it will be understood by those skilled in the art that various changes in form and detail may be made therein without departing from the spirit and scope of the invention.

What is claimed is:

1. A controlling system, comprising:
   a storage unit forming part of a storage system;
   a cache controller connected to the storage unit and performing each cache operation received for data within the storage system, the cache controller including:
      a first plurality of functional units each operating in Parallel and performing only cache operations of a first type; and
      a second plurality of functional units each operating in parallel and performing
   only cache operations of a second type, wherein the functional units performing only cache operations of the second type operate in parallel with the functional units performing only cache operations of the first type;
   an architectural controller coupled to the storage unit and performing at least a portion of each architectural operation received for data within the storage system; and
   managing logic assigning cache operations of the first type to one of the first plurality of functional units and cache operations of the second type to one of the second plurality of functional units.

2. The controlling system of claim 1, wherein the cache controller performs instruction fetch, read and write operations.

3. The controlling system of claim 1, wherein the cache operation of a first type is a read operation.

4. The controlling system of claim 1, wherein the cache operation of a first type is a write operation.

5. The controlling system of claim 1, wherein the at least one functional unit performing only cache operations of a first type further comprises:
   a plurality of functional units, each functional unit within the plurality of functional units performing only read operations.

6. The controlling system of claim 1, wherein the at least one functional unit performing only cache operations of a second type further comprises:
   a plurality of functional units, each functional unit within the plurality of functional units performing only write operations.

7. The controlling system of claim 1, wherein the cache controller performs each cache operation on cacheable memory addresses within the storage system, the controlling system further comprising:
   a noncacheable controller performing each cache operation on noncacheable memory addresses, the noncacheable controller including:
      a unified queue for pending operations; and
      a control unit managing the unified queue.

8. The controlling system of claim 1, further comprising:
   a bus interface unit connected to the cache controller and the architectural controller and receiving operations for data within the storage system.

9. The controlling system of claim 1, further comprising:
   a first bus interface unit connected to the cache controller and the architectural controller and receiving operations on data within the storage system from a processor; and
   a second bus interface unit connected to the cache controller and the architectural controller and receiving operations on data within the storage system from a system bus.

10. The controlling system of claim 1, further comprising:

receiving operations on data within the storage system from a processor at a first bus interface unit connected to the cache controller and the architectural controller; and receiving operations on data within the storage system from a system bus at a second bus interface unit connected to the cache controller and the architectural controller.

11. A method of expediting multiple controlling system designs, comprising:

performing each cache operation for a storage unit forming part of a storage system in a cache controller connected to the storage unit, further including:

performing only cache operations of a first type within one of a plurality of functional units of a first type each operating in parallel within the cache controller;

performing only cache operations of a second type within one of a plurality of functional units of a second type each operating in parallel within the cache controller; and assigning cache operations of the first type to one of the first plurality of functional units and cache operations functional units, wherein the plurality of functional units of the first type and the plurality of functional units of the second type operate in parallel; and performing at least a portion of each architectural operation for data within the storage unit in an architectural controller coupled to the storage unit.

12. The method of claim 11, wherein the step of performing each cache operation for a storage unit forming part of a storage system in a cache controller connected to the storage unit further comprises:

performing instruction fetch, read and write operations in the cache controller.

13. The method of claim 11, wherein the step of performing only cache operations of a first type within at least one functional unit of a first type within the cache controller further comprises:

performing read operations within the at least one functional unit of the first type.

14. The method of claim 11, wherein the step of performing only cache operations of a first type within at least one functional unit of a first type within the cache controller further comprises:

performing write operations within the at least one functional unit of the first type.

15. The method of claim 11, wherein the step of performing only cache operations of a first type within at least one functional unit of a first type within the cache controller further comprises:

performing only read operations within any of a plurality of functional units of the first type.

16. The method of claim 11, wherein the step of performing only cache operations of a second type within at least one functional unit of a second type within the cache controller further comprises:

performing only write operations within any of a plurality of functional units of the second type.

17. The method of claim 11, wherein the step of performing each cache operation for a storage unit forming part of a storage system in a cache controller connected to the storage unit further comprises:

performing each cache operation on cacheable memory addresses within the cache controller; and performing each cache operation on noncacheable memory addresses within a noncacheable controller including a unified queue for pending operations a control unit managing the unified queue.

18. The method of claim 11, further comprising:

receiving operations on data within the storage system at a bus interface unit connected to the cache controller and the architectural controller.

* * * * *